United States Patent [19]
Mack

[11] 3,888,334
[45] June 10, 1975

[54] BICYCLE PEDAL-ACTUATED BRAKE AND FREEWHEEL SYSTEM

[76] Inventor: Richard B. Mack, 21 Westwood Rd., Woodbridge, Conn. 06525

[22] Filed: June 27, 1974

[21] Appl. No.: 483,523

[52] U.S. Cl. ............................................. 188/24
[51] Int. Cl. ................................................ B62l 1/06
[58] Field of Search ............................... 188/24, 27

[56] References Cited
UNITED STATES PATENTS

| | | | |
|---|---|---|---|
| 2,717,662 | 9/1955 | Thompson | 188/27 |
| 3,486,586 | 12/1969 | Grier | 188/24 |

FOREIGN PATENTS OR APPLICATIONS

| | | | |
|---|---|---|---|
| 447,991 | 5/1949 | Italy | 188/24 |
| 522,059 | 6/1940 | United Kingdom | 188/24 |
| 870,048 | 12/1941 | France | 188/24 |
| 1,001,029 | 10/1951 | France | 188/24 |
| 1,028,004 | 2/1953 | France | 188/24 |

*Primary Examiner*—Leo Friaglia
*Attorney, Agent, or Firm*—Kenyon & Kenyon Reilly Carr & Chapin

[57] ABSTRACT

A bicycle having a rear wheel caliper brake actuated by reverse pedal rotation via an over-running clutch connecting the caliper brake operating cable with the bicycle's crank-arm axle, is provided with a freewheel through which the driven sprocket connects with the rear wheel. To prevent a lock-up of the bicycle due to applying the rear wheel brake when the rear wheel is not rotating, the crank-arm axle connects with the drive sprocket through a lost-motion connection. This prevents the sprocket chain from becoming tensioned and via the drive sprocket preventing the crank-arm axle from being rotated forwardly to release the over-running clutch and, therefore, the rear wheel brake.

5 Claims, 5 Drawing Figures

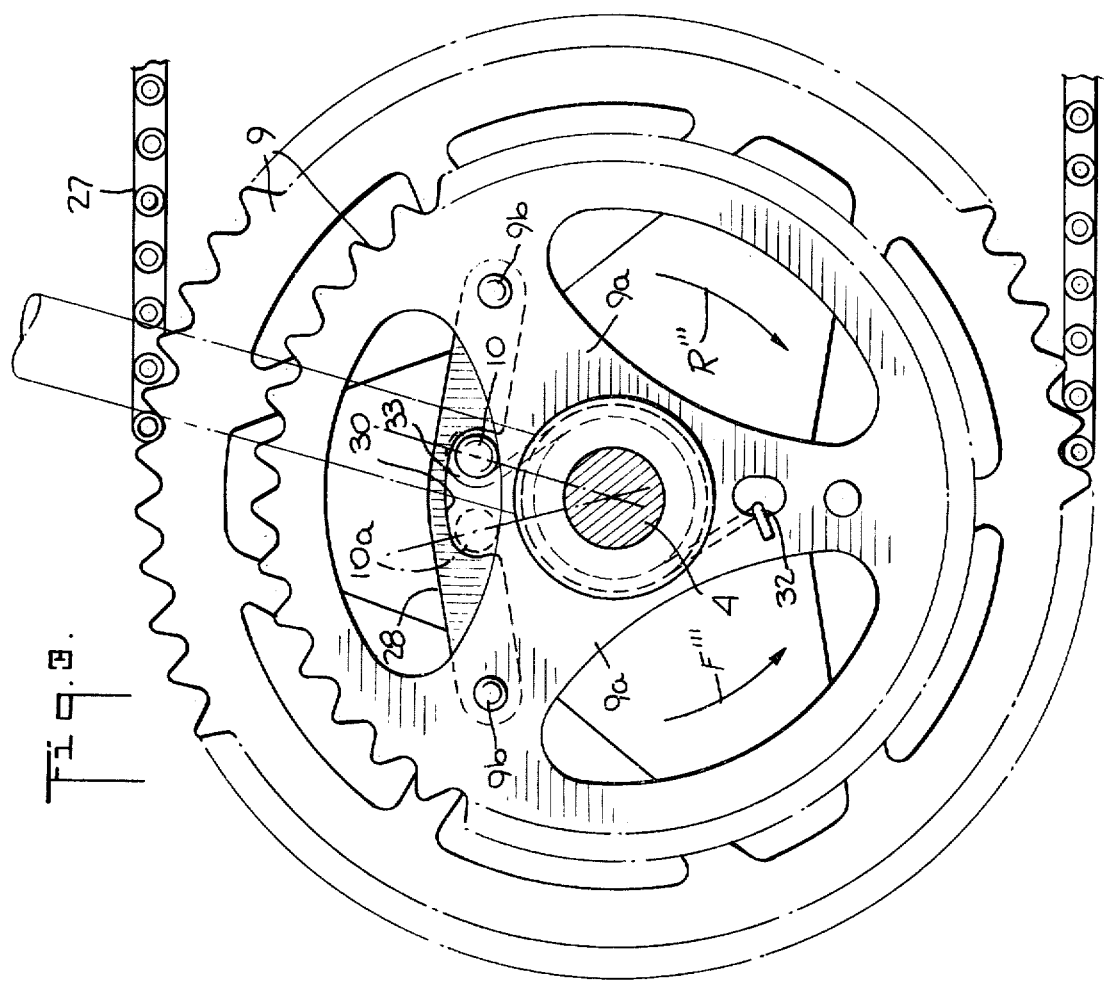
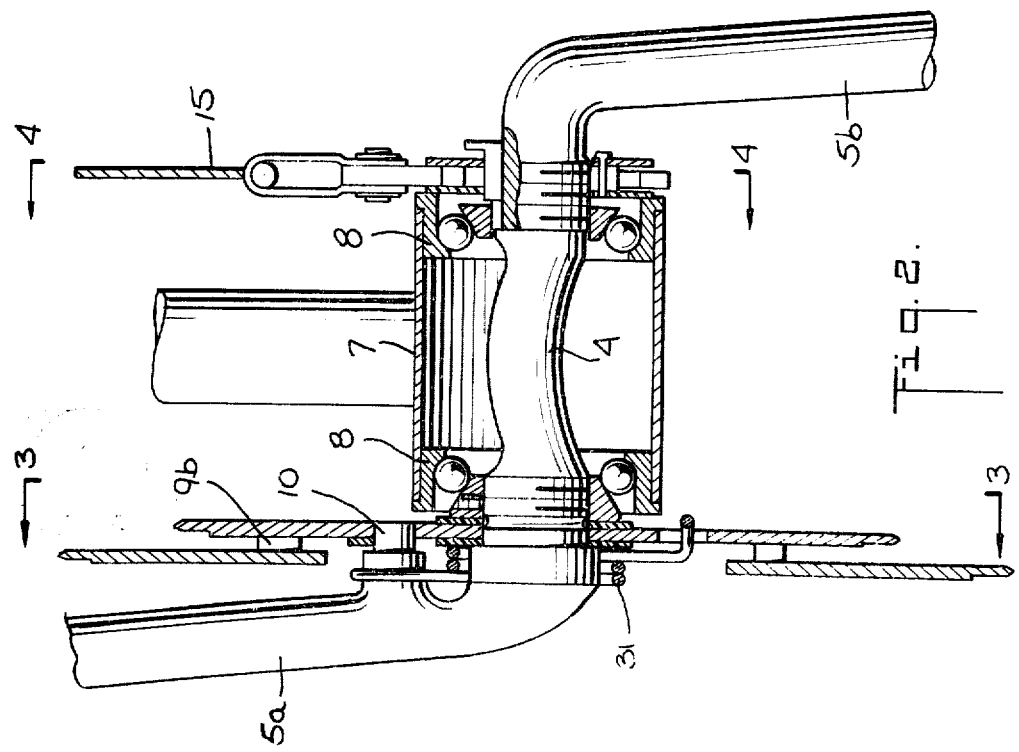

BICYCLE PEDAL-ACTUATED BRAKE AND FREEWHEEL SYSTEM

BACKGROUND OF THE INVENTION

The invention relates to multi-speed bicycles of the type having drive sprockets connected by a chain with a freewheel body and sprocket cluster through which the rear wheel hub is driven, the chain being shifted from sprocket to sprocket by derailers. For braking, the bicycle is provided with front and rear caliper brakes normally actuated via cables by hand levers on the handle-bars with each brake having its own hand lever for actuation.

Operation of the brake hand levers can be confusing, particularly in the case of a rider accustomed to a bicycle having a coaster brake actuated by reverse pedal operation. For a long time it has been desirable to provide some way for actuating the caliper brakes by reverse pedal operation, without complicating the overall operation of the bicycle.

In the case of a single-speed bicycle, Italian Pat. No. 447,991, dated May 4, 1949, proposed the use of an over-running clutch on the crank-arm axle, this clutch being connected with caliper brakes so that by reverse pedal actuation the brakes could be applied, thus eliminating the need for hand levers. This patent further proposed the use of a sprocket provided with shock-absorbing springs.

The Thompson U.S. Pat. No. 2,717,662, dated Sept. 13, 1955, proposed actuation of the caliper brake cables through backward rotation of a perforated disc with which one of the crank-arms could be engaged for backward pedal rotation of the disc, via a pawl thrust into one or another of the perforations of the disc, the pawl being released by forward pedal rotation. A slight play was provided between the crank-arm and the drive sprocket for the purpose of actuating the pawl, the latter being spring-biased to its released or inoperative position. The drawings of this patent show a typical fixed rear-wheel hub having neither a freewheel or a coaster brake.

Finally, the Grier, Jr. U.S. Pat. No. 3,486,586, dated Dec. 30, 1969, again proposed the use of an over-running clutch on the crank-arm axle, the arrangement being much the same as suggested by the Italian patent. However, this patent states that the driven sprocket may be slightly rotated in a reverse direction independently of rotation of the rear wheel; alternately, that a conventional coaster brake could be used to permit the rear wheel caliper brake to be eliminated, the coaster brake then operating in its usual manner.

SUMMARY OF THE INVENTION

According to this invention the over-running clutch is used for the connection between the crank-arm axle and the caliper brake actuating cables with the arrangement being such that reverse rotation of the crank-arm axle applies the caliper brakes, forward axle rotation releasing the caliper brakes. Also, the bicycle is a multi-speed bicycle having its rear-wheel hub driven by the drive sprockets and chain, through the usual freewheel body and sprocket cluster. However, the inventive principles are applicable to any bicycle having a freewheel and rear caliper brake.

The above presents the problem that if the bicycle is brought to a stop with its rear wheel not rotating, it is possible via foot pressure on the crank-arm pedals, to apply the rear caliper brake strongly enough to lock the rear wheel against rotation. To release the over-running clutch and therefore the rear wheel brake, it is necessary to rotate the crank-arm axle forwardly, and since the drive sprocket connected to this axle connects with the driven sprocket through the sprocket chain, the driven sprocket must permit its forward rotation. With the rear wheel locked against forward rotation, by its caliper brake, the freewheel does not permit forward rotation of the driven sprocket, the upper span of the sprocket chain simply becoming loaded with tension and preventing forward rotation of the drive sprocket. The bicycle suffers a lock-up; the bicycle cannot be moved by a technically unskilled bicycle rider.

To solve the foregoing problem, the present invention provides a lost-motion connection between the drive sprocket and the crank-arm axle. When the crank-arm axle is rotated forwardly via forward pedal actuation, the lost-motion of this connection is taken up so that there is a solid forward bicycle operation in the usual manner. When the rear wheel caliper brake is applied by reverse pedal operation and via the over-running clutch arrangement, the lost-motion is recovered as the crank-arm axle is rotated backwardly to cause backward rotation of the drive sprocket, the resulting lost-motion storage then being available to permit the crank-arm axle to be rotated forwardly to release the over-running clutch and therefore the rear wheel brake. The chain span which would otherwise, through the drive sprocket, prevent this forward rotation of the axle, remains free from tension loading.

It follows that the present invention makes possible the use of a freewheel, or in the case of a multi-speed bicycle, the conventional freewheel and sprocket cluster, while enjoying the advantage of the over-running clutch arrangement for applying the caliper brakes not only to the front wheel but to the rear wheel of the bicycle also.

DESCRIPTION OF THE DRAWINGS

The presently preferred mode for carrying out the invention is illustrated by the accompanying drawings, in which:

FIG. 2 is a cross-section taken on the line 2—2 in FIG. 1;

FIG. 3 is a longitudinal section taken on the line 3—3 in FIG. 2;

DESCRIPTION OF THE INVENTION

Figure 1:
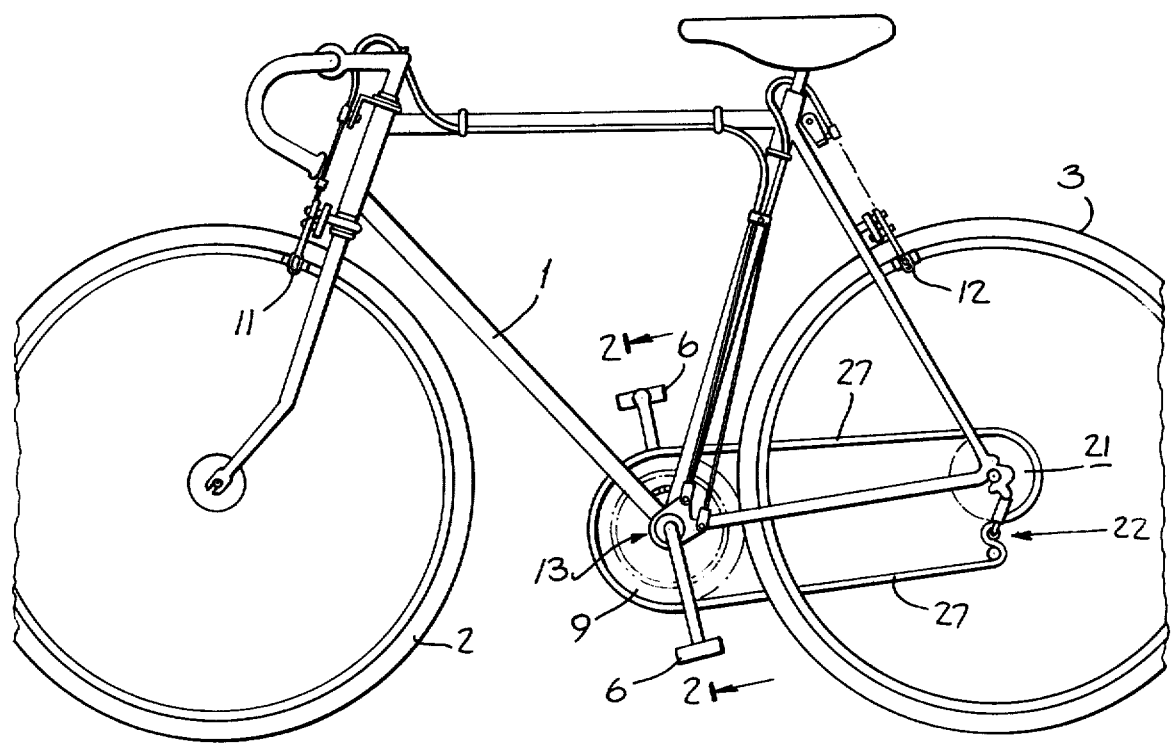
FIG. 1 is a side view of the bicycle.

Referring first to FIG. 1, the bicycle frame 1 is supported by the front wheel 2 and the rear wheel 3. As shown by FIG. 2, the hanger set is in this instance of the American type and includes, as shown in detail in FIG. 2, the one-piece unit made up of the crank-arm axle 4 and the crank arms 5a and 5b. These crank arms are manually driven by the usual pedal 6. The axle 4 is journaled in the frame's bottom bracket 7 via anti-friction bearings 8. The two drive sprockets 9 which are interconnected to rotate as a unit, are mounted on the crank-arm axle on the outside of the bottom bracket 7 adjacent to the crank arm 5a with the latter having the pin 10 which normally fits without play in a hole formed in the inner one of the drive sprockets 9.

In FIG. 1 the caliper brakes are shown as 11 and 12 for the wheels 2 and 3, respectively, and for actuating the caliper brakes, the brake actuating cables are shown attached to the over-running clutch 13. These are effective brakes capable of locking the wheels positively against rotation.

Figure 4:
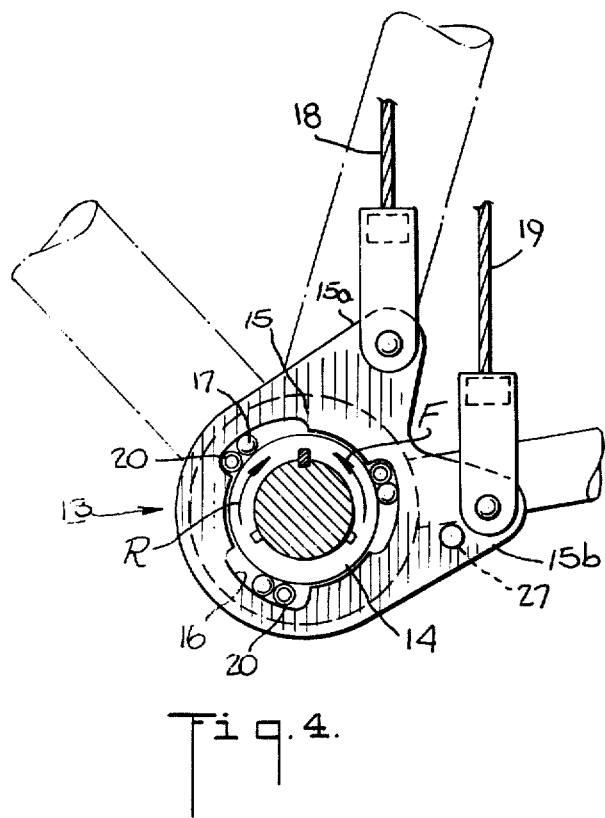
FIG. 4 is a cross-section taken on the line 4—4 in FIG. 2.

Referring to FIGS. 2 and 4, the over-running clutch 13 comprises a cylindrical inner race-way 14 keyed to the axle 4 adjacent to the crank arm 5b on the outside of the bottom bracket 7, and an outer race-way 15 having the usual arcuate slots 16 in which solid rollers 17 are retained, these slots having surfaces radially facing the surface of the race-way 14 and which decline towards the latter in a direction opposite to that of the forward freewheeling direction, in this case indicated by the arrow F representing the forward rotation of the axle 4. During over-running the rollers 17 ride into the large ends of the slots and free the outer race-way 15 from any driving connection with the axle 4 via the race-way 14. Reverse rotation of the axle 4 in the direction of the arrow R, causes the rollers 17 to roll backwardly and jam between the two race-ways, effecting a rotative driving connection between the two. It is this operation that applies the brakes, the outer race-way 15 being formed with lever arms 15a and 15b with which the cables 18 and 19 connect, these cables being the operating cables for the brakes 11 and 12, respectively.

In this instance, the freewheel clutch is improved over prior art clutches by having the rolling elements 17 urged towards their operative positions by radially elastically flexible, tubular elements or springs 20. Being tubular and preferably made of elastic plastic providing adequate resiliency, these springs can roll and present different surfaces to the rollers 17 and the race-ways, thus contrasting with resilient members which present plane surfaces to the rollers. Moisture and dirt cannot easily put these tubular springs out of operation. They are always available to urge the rollers 17 away from the large ends of the slots or segments of the outer race-way, enough to provide for prompt brake actuation by reverse rotation of the crank-arm axle 4, effected by reverse operation of the pedals 6.

This bicycle is of the multi-speed type, FIGS. 2 and 3 showing the two drive sprockets connected together. Although not shown in detail, the conventional freewheel body and sprocket cluster is illustrated at 21 in FIG. 1, together with a conventional rear derailer 22. The front derailer (not shown) may also be conventional. In the usual way the freewheel body is coaxially positioned within the sprocket cluster, and so that the action producing a lock-up of the bicycle may be understood, FIG. 5 schematically illustrates the principles of the usual freewheel construction.

Figure 5:
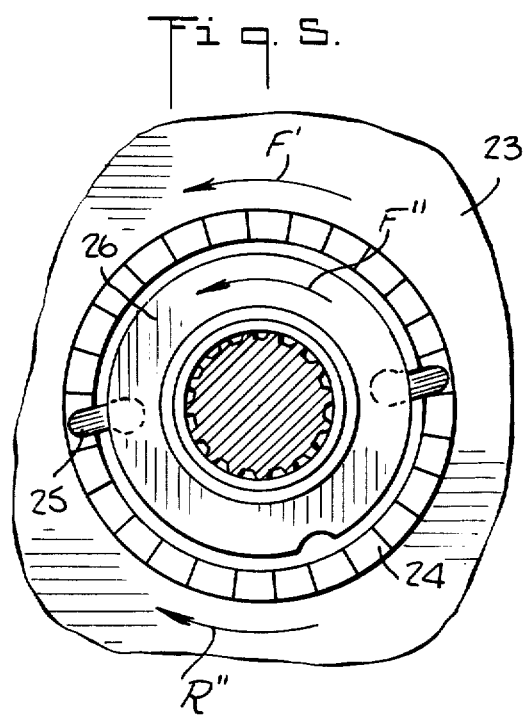
FIG. 5 schematically illustrates the principles of the typical freewheel body.

In this FIG. 5, the inside face of the sprocket cluster is indicated at 23 with the freewheel body internal ratchet wheel 24, the pawls 25 being mounted on a mounting ring 26 which is fixed to the rear wheel hub. The construction is such that the sprocket cluster 23 can rotate forwardly and backwardly relative to the ring 26 fixed to the rear wheel hub as long as the rear wheel, and therefore this hub, is rotating at adequate speed; when the rear wheel is locked stationary and the ring 26 cannot rotate, the pawls lock on the ratchet wheel teeth and the sprocket cluster 23 cannot be rotated forwardly, excepting that if by chance the pawls have just passed the ratchet teeth crests, and then only for the pitch of the ratchet teeth.

In operation, forward rotation of the crank-arm shaft 4 in the direction of the arrow F permits over-running of the axle 4 relative to the outer race-way 15 of the clutch 13, and forward rotation of the sprocket cluster 23 in the direction of the arrow F' causes the pawls 25 to be engaged by the teeth of the ratchet wheel 24 and drive the rear wheel hub forwardly in the direction of the arrow F''. The wheel hub and ring 26 can freewheel by the pawls riding up the slopes of the ratchet wheel teeth when the wheel speed is faster than the sprocket cluster speed.

For braking, reverse rotation of the axle 4 causes the rollers 17 to jam between the race-way declining slots 16 and the cylindrical race-way 14, thus rotating the outer race-way 15 and causing its lever arms 15a and 15b to apply the front and back caliper brakes. This outer race-way is normally locked against excessive forward rotation by a pin 27 which engages an adjacent portion of the bicycle frame. As the bicycle comes to a stop with the rear wheel no longer rotating, it is possible by back pedal pressure to apply the brakes so firmly that the wheels, including the rear wheel, are locked against rotation. This has turned the freewheel and drive sprocket backwardly, the ratchet teeth of the freewheel internal ratchet wheel riding past the pawls with the latter locking the freewheel against forward rotation. To release the over-running clutch, the crank-arm axle must be rotated forward and when it is connected with the drive sprocket to prevent relative rotative movement between the axle and this sprocket, such forward rotation becomes impossible. The freewheel and driven sprocket hold the sprocket chain in tension with the drive sprocket and therefore the crank-arm axle firmly locked against forward rotation. The previously referred to lock-up occurs and the bicycle cannot be moved without aid from a technically skilled person.

With the rear wheel locked against rotation by its brake, any conventional freewheel does permit forward rotation of the driven sprocket if by chance the freewheel ratchet wheel teeth crests have just approached but not yet been engaged by the pawls. However, such possible forward rotation depends on chance and in any event permits a maximum forward rotation fixed by the pitch or crest interspacing of the freewheel ratchet wheel teeth. The extent of forward rotation thus permitted is normally insufficient to permit disengagement of the over-running clutch and therefore release of the brakes.

According to the present invention, the pin 10 does not fit without play, or very little play, in the usual sprocket wheel hole. The drive sprockets 9 have radial spokes 9a and a metal strap 28 is connected to span two of these spokes 9a with the strap's ends fastened rigidly to these spokes by the sprocket interfastenings 9b. This strap is formed with an arcuate slot 30 in which the crank pin 10 rides arcuately back and forth, substantially coaxially with the crank-arm axle 4, thus providing one example of the previously referred to lost-motion connection between the axle 4, via the crank arm 5a, and the sprockets 9. During forward rotation of the sprockets 9 in the direction of the arrow F''' shown in FIG. 3, the pin 10 rides against or abutts the forward end of the slot 30 as shown by a broken line circle 10a. Therefore, the drive is solid and free from play. Reverse rotation to apply the brakes results in the pin 10 riding backwardly in the slot 30 to its back end, when applying the brakes.

However, when the rear wheel is locked by its brake there can be no tension on the sprocket chain interconnecting the drive and driven sprockets because the drive sprocket is free to move reversely in the direction of the arrow R'''. Therefore, the crank-arm axle 4 may be turned forwardly, the rotative distance required to release the over-running clutch 13 and therefore the brakes. The lost-motion provided by the extent of the slot 30 should permit free relative rotation between the drive sprockets 9 and the crank-arms and axle, of approximately 40°, in the case of the design of the over-running clutch described hereinbefore.

Between the crank-arm 5a and the drive sprockets 9, a torsion spring 31 surrounds the axle, one end 32 of this spring being connected with the drive sprockets and the opposite end 33 being connected with the pin 10, the arrangement being such as to apply a spring bias normally keeping the pin 10 as shown in solid line, in engagement with the back end of the slot 30. This prevents looseness of the parts such as might cause a rattle and it provides positive assurance that the lost-motion will always be available after back pedal operation.

The bias exerted by this spring 31 should be relatively small in its force, because the forward axle rotation to release the brake clutch is against the force exerted by this spring. If the spring force is too high, the forward crank-arm axle rotation required for the brake release is too great for the average person to overcome.

Although not illustrated, in the case of the European or cottered crank construction, the cotter grooves in the axle can be arcuately extended to provide the lost-motion connection of the present invention.

I claim:

1. A bicycle comprising a frame, front and rear wheels supporting said frame, a crank-arm axle rotatively mounted by said frame, a drive sprocket connected with said axle, a driven sprocket connected with said rear wheel, a sprocket chain interconnecting said sprockets, a caliper brake for at least said rear wheel, and means for applying said brake by reverse rotation of said axle and releasing the brake by forward rotation of the axle; wherein the improvement comprises means for connecting said driven sprocket with said rear wheel so that the rear wheel can freewheel relative to the driven sprocket and the driven sprocket substantially cannot rotate forwardly when the rear wheel is held against rotation by said brake, and means for connecting said drive sprocket with said axle with a lost-motion action permitting limited relative rotation of said axle and said drive sprocket.

2. The bicycle of claim 1 in which said means for connecting said drive sprocket with said axle comprises a part having a slot and a second part riding backwardly and forwardly in said slot, said parts being arranged so that said parts interengage solidly during forward rotation of the drive sprocket and can move relative to each other during relative reverse rotation of the drive sprocket and forward rotation of said axle.

3. The bicycle of claim 2 in which a spring biases said parts to interengage solidly during backward rotation of said drive sprocket.

4. The bicycle of claim 2 in which said means for applying said brake is an over-running clutch having relatively rotating parts respectively connected to said axle and to said brake and forming radially opposed raceways, at least one rolling element between said raceways, the latter constricting in a direction causing said rolling element to jam therebetween during reverse rotation of said axle to thereby apply said brake and to permit the axle to over-run during forward rotation, said raceways defining a front end in which said element positions during over-running, and a tubular elastically deformable spring between said raceways and between said front end and said element and positioned for rolling between the raceways and element.

5. The bicycle of claim 2 in which said part having said slot is connected to said drive sprocket, a crank-arm is connected to said axle and extends radially with respect to said drive sprocket, and a pin projects from said crank-arm and rides in said slot to form said second part.

* * * * *